US007621053B2

(12) United States Patent
Bianchin

(10) Patent No.: US 7,621,053 B2
(45) Date of Patent: Nov. 24, 2009

(54) ASSEMBLY APPARATUS

(75) Inventor: Edward S. Bianchin, Waterloo (CA)

(73) Assignee: Virtek Vision International Inc., Waterloo (CA)

( * ) Notice: Subject to any disclaimer, the term of this patent is extended or adjusted under 35 U.S.C. 154(b) by 57 days.

(21) Appl. No.: 11/786,953

(22) Filed: Apr. 13, 2007

(65) Prior Publication Data

US 2008/0250657 A1 Oct. 16, 2008

(51) Int. Cl.
*A41H 1/00* (2006.01)
*B23P 21/00* (2006.01)

(52) U.S. Cl. ....................... 33/16; 33/286; 33/DIG. 21; 269/37; 29/281.3; 29/712; 29/897.31

(58) Field of Classification Search ..................... 33/11, 33/16, 286, 613, 645, DIG. 21, 1 G, 1 K, 33/1 AA; 29/281.1, 281.3, 897.31, 407.05, 29/709, 712, 714, 716; 269/37, 13, 14, 305, 269/900, 910; 254/37, 305, 900
See application file for complete search history.

(56) References Cited

U.S. PATENT DOCUMENTS 5,170,558 A * 12/1992 Hubbard .................. 29/897.31
5,342,030 A * 8/1994 Taylor ......................... 269/37
5,615,013 A 3/1997 Rueb et al.
5,646,859 A 7/1997 Petta et al.
5,663,795 A 9/1997 Rueb
5,810,341 A * 9/1998 Williams ..................... 269/37
6,011,255 A 1/2000 Rueb et al.
6,066,845 A 5/2000 Rueb et al.
6,170,163 B1 1/2001 Bordignon et al.
6,317,980 B2 * 11/2001 Buck, III ................. 29/897.31
6,560,858 B1 * 5/2003 McAdoo ...................... 29/772
2005/0121422 A1 6/2005 Morden et al.

* cited by examiner

*Primary Examiner*—Amy Cohen Johnson
(74) *Attorney, Agent, or Firm*—Crowell & Moring LLP

(57) ABSTRACT

An assembly apparatus for assembling components including a work surface, a laser projector, a computer controlling the laser projector to protect a laser image on the work surface, and an ejector lifting a completed assembly from the work surface having a retro-reflective surface within a field of view of the laser projector when the ejector is lifted, such that the laser projector scans the retro-reflective surface and the computer determines at least one of the number of completed assemblies made and the time required to make the assembly.

10 Claims, 3 Drawing Sheets

ASSEMBLY APPARATUS

FIELD OF THE INVENTION

This invention relates to an apparatus for assembling components of an assembly, such as a truss, using a laser projector adapted for time tracking of the assembly.

BACKGROUND OF THE INVENTION

Visible laser projection systems are now widely used by industry to project a laser outline, laser image or laser template on a target surface or work surface for assembling large two or three-dimensional structures or assemblies, such as prefabricated roof trusses and aerospace composites. By precisely characterizing the laser projection and establishing the exact relative position of the laser projector to the assembled structure, composite or target work piece, the laser projector system is capable of accurately producing a laser image or template at precisely known coordinates on a target surface or work surface which may be planar or curvilinear. For example, U.S. Pat. No. 5,646,859 assigned in part to the assignee of this application discloses a method and apparatus for defining a laser template for assembling the components of a structure, such as a prefabricated roof truss. The method and apparatus disclosed in this patent includes a laser projector or a plurality of laser projectors mounted above a work surface, a plurality of sensors or laser targets fixed at predetermined locations on or adjacent the work surface, a computer and a sensor on the laser projector. The laser projector periodically or continuously scans the laser targets, such as laser targets having a retro-reflective surface, and a reflected light from the laser targets to the sensor of the laser projector determines the precise projection angle associated with each of the laser target datum. Using a series of mathematical algorithms, the precise position and orientation of the laser projector relative to the work surface is then calculated by a computer associated with the laser projector. The spatial information in conjunction with a known display list or data stored in the computer allows the laser projector to generate accurate laser templates on the work surface.

In the assembly of a prefabricated roof truss assembly, for example, the computer may control the laser projector or projectors to project an image or laser outline of the components of the truss assembly in the assembled position on the work surface including the chords, webs, nail plates, etc. and the components may then assembled on the laser outline and secured in place as by pressing or rolling the assembled components, thereby driving the nail plates into the chords and webs. Where a number of identical truss assemblies are made in mass production applications, jigs movable on the work table may be used to align the components of the assembly and the jigs may be located on the work surface using the laser projector as disclosed, for example, in U.S. Pat. No. 6,170,163 assigned to the assignee of this application. Improvements in assembly tables have also been made, such as the "Slotted-Top Tables" available from MiTek Industries, Inc. of Chesterfield, Mo., which include a plurality of linear elongated ejector slots in the table having pneumatically operated "pop-up" ejectors which lift the assembled truss from the assembly table. The use of MiTek's Slotted-Top Table in combination with the RoofTracker® laser projection system available from the assignee of this application provides a very efficient apparatus for assembly of roof trusses.

However, it would be desirable to automatically track the number of trusses assembled, for example, the number of trusses of each design or specification assembled, and the time of assembly of each truss without requiring wires or cables between the assembly table and the computer.

SUMMARY OF THE INVENTION

The apparatus for assembling components of an assembly of this invention includes a work surface for receiving components of an assembly, such as the components of a roof truss, a laser projector or laser projectors for projecting a laser image on the work surface, a computer controlling the laser projector to project a laser image on the work surface, such as the components to be assembled oriented for assembly, and an ejector lifting the assembly from the work surface upon completion of the assembly having a retro-reflective surface in a field of view of the laser projector, whereby the laser projector scans the retro-reflective surface and the computer determines at least one of the number of assemblies made and the time required to make the assembly. Thus, the apparatus of this invention may be conventional except for the retro-reflective surface of the ejector and the computer software which controls the laser projector to scan the retro-reflective surface of the ejector, determining when an assembly is complete and automatically track the number of trusses assembled and the time required for assembly of the components without substantial additional cost for the assembly or wires from the computer to the assembly table.

In one preferred embodiment of the apparatus, the ejectors are elongated fluid-actuated ejectors having a retro-reflective upper surface which is within a field of view of the laser projector when the ejector is raised. Alternatively, the retro-reflective surface may be located anywhere on the ejector and may be obscured from the laser projector only when the assembled components are located on the work surface. Further, in one preferred embodiment, the work surface is horizontal for truss assembly, for example, and the laser projector is located above the work surface. In the disclosed embodiment, the work surface includes a plurality of ejector channels and the ejectors are fluid-actuated or pneumatic and located within the ejector channels, wherein each of the ejectors includes a retro-reflective upper surface.

The apparatus for assembling components of an assembly of this invention thus provides for automatic tracking of the number of the trusses assembled, which may include tracking the number of trusses of each specification assembled, and the time of assembly, without requiring wires between the assembly table and the computer and without substantial additional costs. The apparatus of this invention thus achieves a primary object of this invention.

DESCRIPTION OF THE PREFERRED EMBODIMENTS

Figure 1:
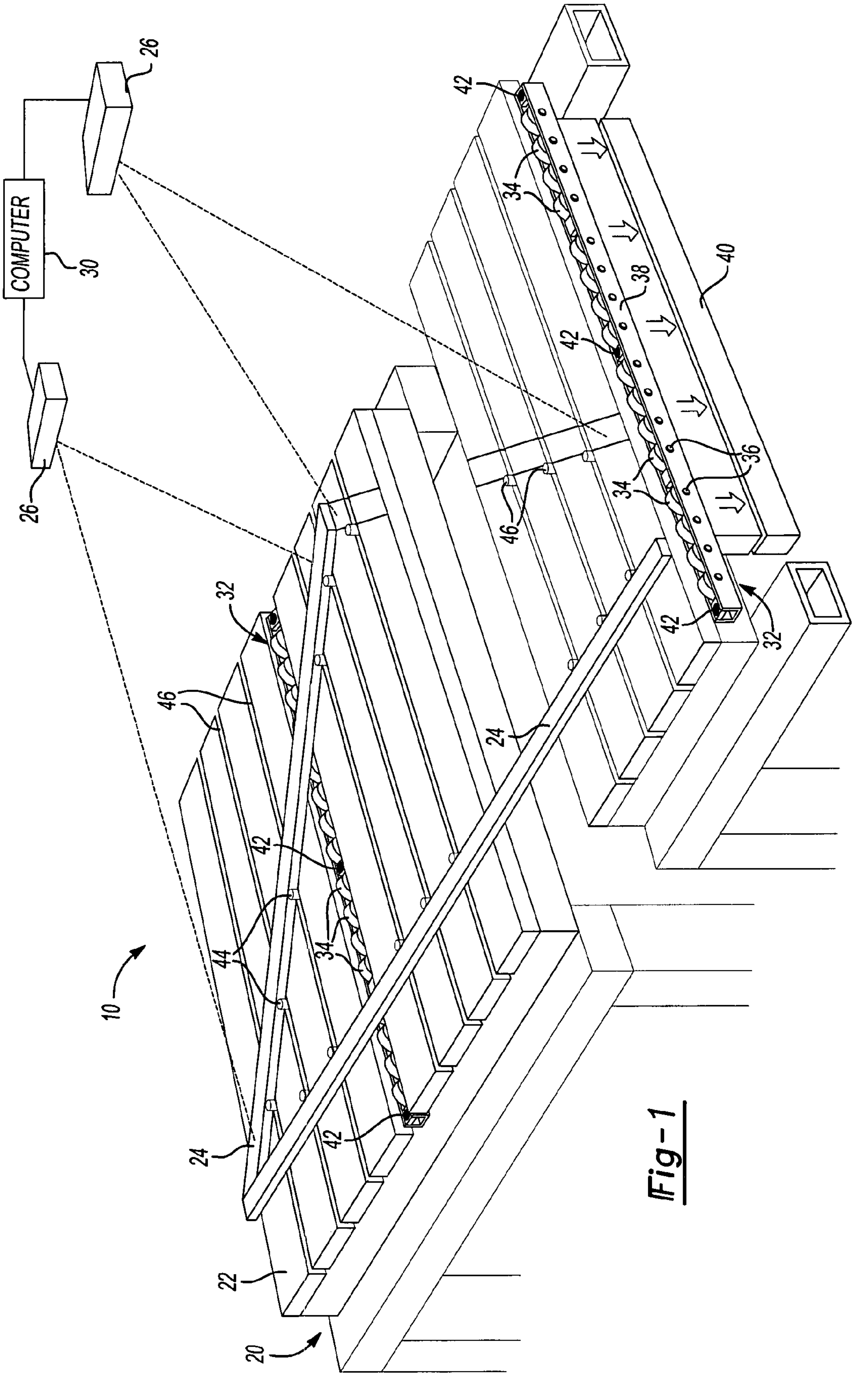
FIG. 1 is a top perspective view of one embodiment of an apparatus for assembling components of an assembly of this invention during assembly of the components.

As set forth above, the assembly apparatus of this invention may be utilized to assemble components of an assembly, such as a prefabricated roof truss or other components of an assembly. However, the assembly apparatus of this invention is not limited to the disclosed embodiment and various modifications may be made by a person of ordinary skill in this art to the disclosed embodiment within the purview of the appended claims.

The embodiment of the assembly apparatus 10 shown in the figures includes a work table 20 having a work surface 22 for receiving components to be assembled, such as the components 24 of a truss, a laser projector or projectors 26 and a computer 30 controlling the laser projectors 26 to project a laser image on the work surface 22 for assembling components of an assembly as is known in this art and disclosed in the above-referenced U.S. Pat. No. 5,646,859.

Figure 2:
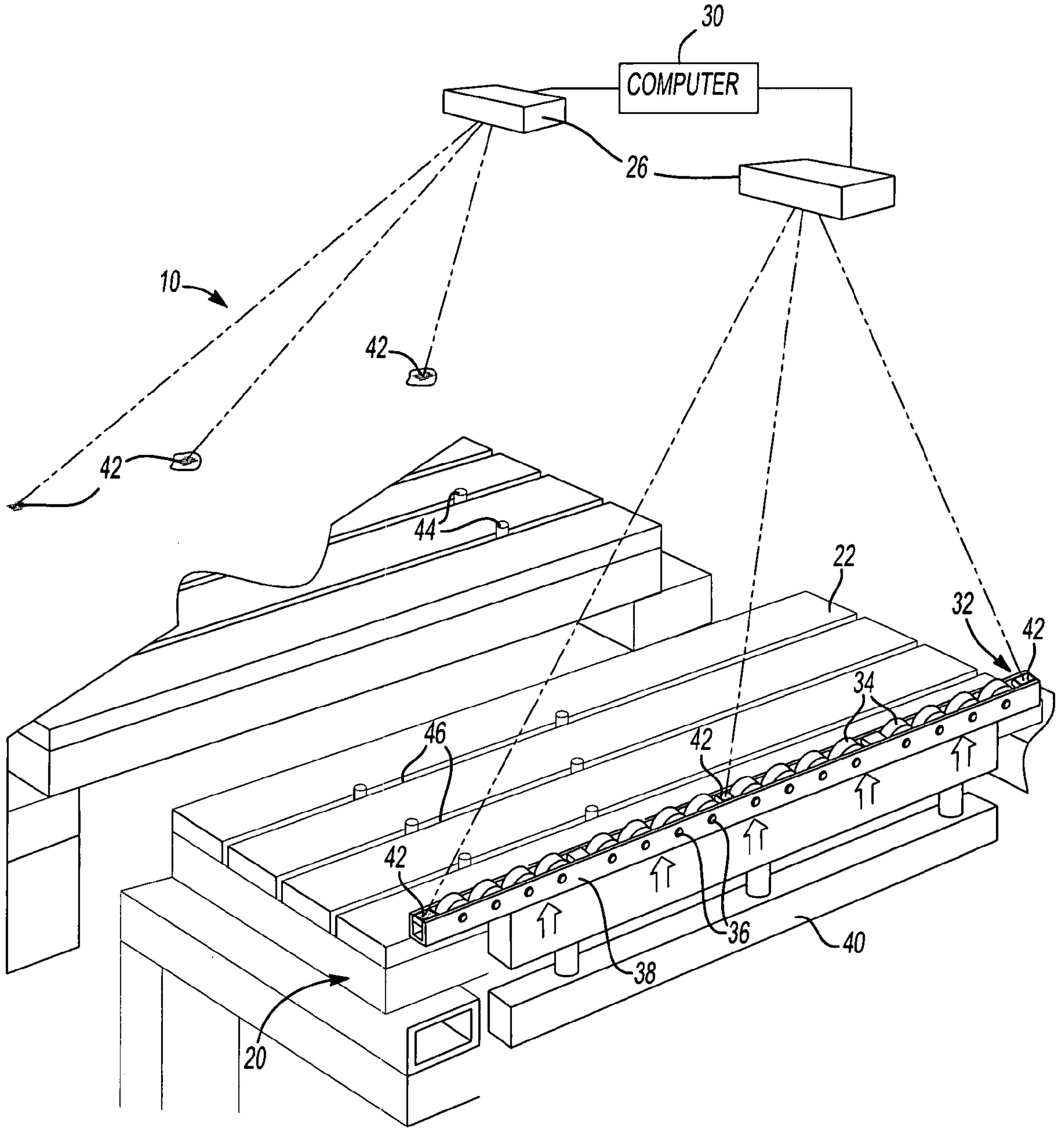
FIG. 2 is a partial top perspective view of the apparatus shown in FIG. 1 following removal of the assembly.
Figure 3:
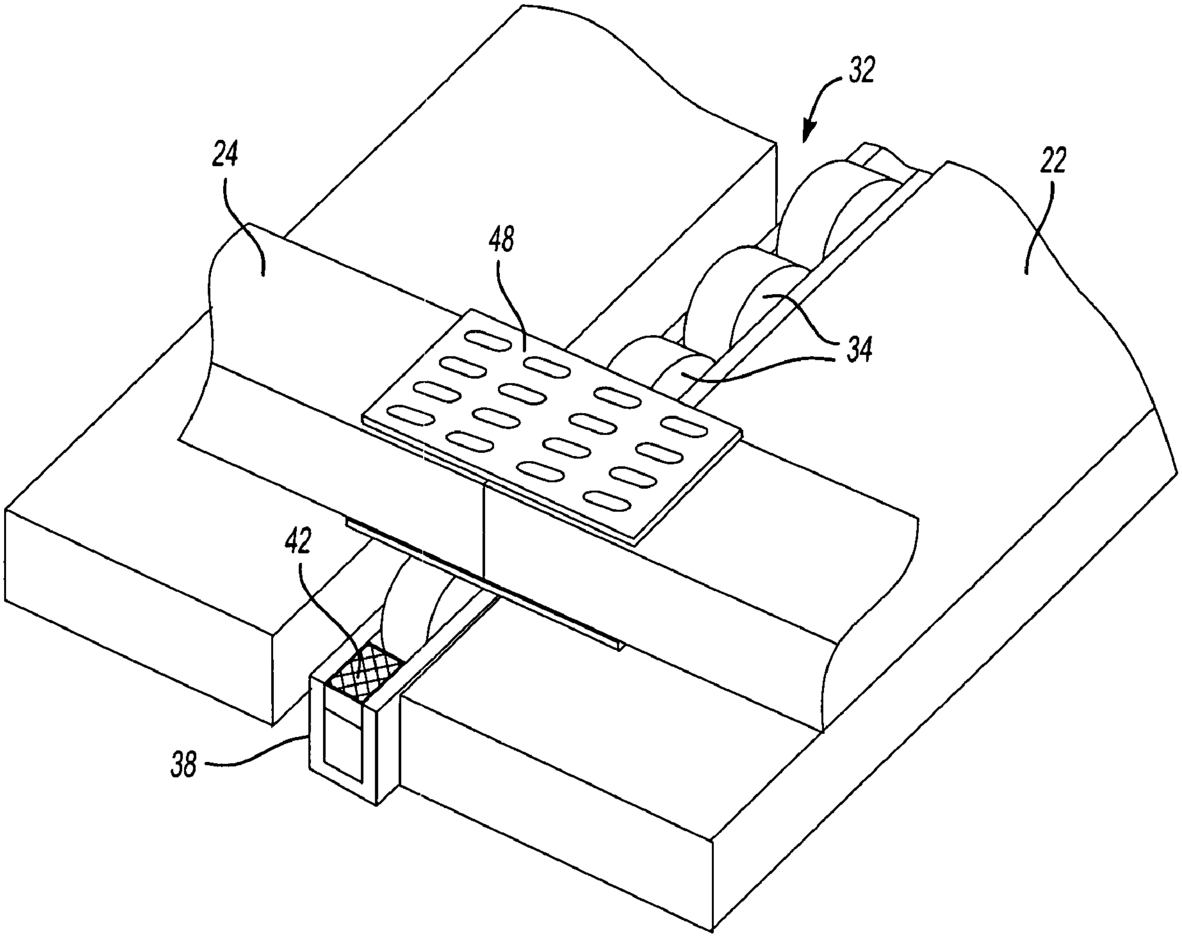
FIG. 3 is an enlarged top perspective view of FIG. 1.

In this embodiment of the assembly apparatus 10, the work table 20 includes elongated "pop-up" ejectors 32 which may be raised upon completion of the assembly to remove the assembly from the work table and then lowered again for assembly of another truss. In the disclosed embodiment, the ejectors 32 include a plurality of rollers 34 rotatably supported on axles 36 in a U-shaped housing 38. As will be understood, the ejector assembly including the U-shaped housing 38 and the rollers 34 may be raised and lowered by any suitable means. However, in this embodiment, the ejector is raised and lowered by a pneumatic piston assembly 40 as shown by the arrows in FIGS. 1 and 2. Further, as described herein, the ejectors 32 each include a retro-reflective surface 42 as best shown in FIG. 3. In this embodiment, the ejectors each include a retro-reflective surface 38 adjacent the ends and middle of the ejectors 32 as shown in FIG. 1. The retro-reflective surfaces 42, which typically include retro-reflective beads, may be incorporated in a tape of painted on.

The disclosed embodiment of the work table further includes a plurality of jigs 44 which are slideably supported in jig channels 46 for alignment of components of an assembly on the work surface 22 as disclosed in the above-referenced U.S. Pat. No. 6,170,163. Slotted-top jigging work tables of the type disclosed herein are available from MiTek Industries, Inc. as set forth above.

As will be understood by those skilled in this art, the computer 30 controls the laser projectors 26 to project a laser image on the work surface 22 as shown in FIG. 1. The laser projectors 26 may be controlled by the computer 30 to project a laser image or laser template of the components 24 to be assembled on the work surface 22 oriented for assembly as disclosed in the above-referenced U.S. Pat. No. 5,646,859. Alternatively, the laser projectors 26 may be controlled to identify the precise locations of the jigs 44 for assembly of the components 24 as disclosed in the above-referenced U.S. Pat. No. 6,170,163, the disclosure of which is incorporated herein. The embodiment of the assembly apparatus 10 shown in FIG. 1 includes slideable or adjustable jigs 44 and the laser projectors 26 are utilized to locate the jigs 44 on the table to assemble components of an assembly, such as the truss components 24 which are aligned by the jigs 44. During the assembly, the retro-reflective surfaces 42 on the ejectors 32 may be located below the plane of the work surface 22 as shown in FIG. 1. Upon completion of the assembly, the ejectors 32 are raised by the pneumatic piston assembly 40 and the assembled components may then be easily rolled off of the work table on the rollers 34, clearing the work surface 22 for assembly of another truss as shown in FIG. 2. The retro-reflective surfaces 42 are then located above the plane of the work surface 22 as shown in FIG. 2 and the computer then controls the laser projectors 26 to scan the retro-reflective surfaces 42 and the computer 30 then confirms the completion of the assembly.

The computer software can thus track the number of assemblies made by tracking the number of times the ejectors 32 are raised and scanned upon completion of the assembly. Further, the computer software can also track the time elapsed to complete an assembly. The laser projectors can also track the number of assemblies completed for each type or specification of trusses manufactured or assembled on the work table and the time required to assemble each type of truss. FIG. 3 is an enlarged partial view of FIG. 1 which partially illustrates the assembled components 24 of a truss assembly including nail plates 48 just prior to raising the ejectors 32 as described above. The method of assembly utilizing the assembly apparatus 10 of this invention thus includes using the computer 30 to control the laser projector or projectors 26 to project a laser template on the work surface 22, assembling the components 24 and then raising the ejectors 32. The method then includes controlling the laser projectors to scan the retro-reflective surfaces 42 and the computer then determines at least one of the number of computer assemblies made and the time required to make a completed assembly.

Having described one preferred embodiment of an assembly apparatus 10 of this invention, it will be understood that various modifications may be made to the assembly apparatus within the purview of the appended claims. For example, the assembly jigs 44 are optional and the laser projector 26 may be utilized to project a laser template of the assembled components 24 and the assembled components are then simply assembled on the laser template projected on the work surface 22. Various types of ejectors may also be utilized, but in a preferred embodiment, the ejectors may be raised and lowered as described above. Having described the assembly apparatus of this invention, the invention is now claimed as follows.

The invention claimed is:

1. An apparatus for assembling components of an assembly, comprising:

a work surface for receiving components of an assembly;

a laser projector for projecting a laser image on said work surface;

a computer controlling said laser projector to project a laser image on said work surface for assembly of the components; and an ejector lifting a completed assembly from said work surface having a retro-reflective surface in a field of view of said laser projector when said ejector is lifted, whereby said laser projector scans said retro-reflective surface of said ejector and said computer determining at least one of the number of completed assemblies made and the time required to make a completed assembly.

2. The apparatus as defined in claim 1, wherein said ejector is an elongated fluid-actuated ejector having a retro-reflective upper surface.

3. The apparatus as defined in claim 1, wherein said work surface is horizontal and said laser projector is suspended above said horizontal work surface.

4. The apparatus as defined in claim 1, wherein said work surface includes a plurality of elongated ejector channels and said ejector is a fluid-actuated ejector located within one of said elongated ejector channels.

5. The apparatus as defined in claim 1, wherein the assembly is a truss, said work surface is a surface of a table and said laser projector is located above said table.

6. The apparatus as defined in claim 5, wherein said table includes a plurality of elongated ejector channels and said ejectors are located within said ejector channels each having a retro-reflective upper surface.

7. An apparatus for assembling a truss, comprising:

a work table having a work surface for assembling components of a truss;

a laser projector mounted over said work surface for projecting a laser image on said work surface;

a computer controlling said laser projector to project a laser image on said work surface for assembly of a truss; and a plurality of ejectors in said table lifting an assembled truss from said table, each ejector having a retro-reflective surface within a field of view of said laser projector, whereby said laser projector scanned said retro-reflective surface of said ejectors upon removal of an assembled truss and said computer determines at least one of the number of assembled trusses made and the time required to make a truss.

8. The apparatus as defined in claim 7, wherein said work table includes a plurality of spaced elongated ejector channels each having an ejector mounted therein.

9. The apparatus as defined in claim 7, wherein said ejectors are fluid-actuated ejectors each having a retro-reflective upper surface.

10. The apparatus as defined in claim 7, wherein said ejectors are fluid-actuated to lift an assembled truss and said retro-reflective surface is on an upper surface of said ejectors within a field of view of said laser projector when said ejectors are raised.

* * * * *